US012612287B1

(12) United States Patent
Guilani

(10) Patent No.: US 12,612,287 B1
(45) Date of Patent: Apr. 28, 2026

(54) HIGH STRENGTH CORD WITH IMPROVED DETECTABILITY

(71) Applicant: Otis Elevator Company, Farmington, CT (US)

(72) Inventor: Brad Guilani, Woodstock Valley, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/185,333

(22) Filed: Mar. 16, 2023

(51) Int. Cl.
*B66B 7/06* (2006.01)
*B66B 7/12* (2006.01)

(52) U.S. Cl.
CPC ............ *B66B 7/062* (2013.01); *B66B 7/1223* (2013.01)

(58) Field of Classification Search
CPC ......... B66B 7/062; B66B 7/1223; B66B 7/06; D07B 2501/2007; D07B 3/005; D07B 1/0626
See application file for complete search history.

(56) References Cited

U.S. PATENT DOCUMENTS 5,461,850 A * 10/1995 Bruyneel ............. D07B 1/0613 57/902
5,475,973 A * 12/1995 Furukawa ............ D07B 1/0693 57/232
5,566,786 A * 10/1996 De Angelis ............ D07B 1/165 187/266
5,651,245 A * 7/1997 Damien ............... D07B 1/0686 57/220
6,276,120 B1 * 8/2001 Adriaensen ............ D07B 1/162 57/212
6,314,711 B1 * 11/2001 De Angelis ............... B66B 7/06 57/213
6,739,433 B1 * 5/2004 Baranda .................. B66B 15/04 187/254
7,036,298 B2 * 5/2006 Honda ................... D07B 1/165 57/217
7,123,030 B2 * 10/2006 Robar .................... G01N 27/82 324/693
7,152,391 B2 * 12/2006 Vanneste ............... B60C 9/0007 57/237
7,162,858 B2 * 1/2007 Graham ................. D07B 5/006 57/213

(Continued)

FOREIGN PATENT DOCUMENTS

WO WO-2012087304 A1 * 6/2012 ........... B66B 11/008
WO WO-2013089723 A1 * 6/2013 ............. B66B 7/062
WO WO-2016096395 A1 * 6/2016 ............... B66B 7/06

OTHER PUBLICATIONS

Extended European Search Report for European Application No. 24160013.9; Report Mail Date Jul. 24, 2024 (8 Pages).

*Primary Examiner* — Minh Truong
*Assistant Examiner* — Michelle M Mudwilder
(74) *Attorney, Agent, or Firm* — CANTOR COLBURN LLP

(57) ABSTRACT

A tension element for use in a load bearing member of an elevator system includes a first layer having a plurality of first wires and a second layer having a plurality of second wires. The second layer is positioned radially outward of and surrounds the first layer. The first layer has a first lay direction and the second layer has a second lay direction. The second lay direction is opposite the first lay direction.

15 Claims, 5 Drawing Sheets

(56) References Cited

U.S. PATENT DOCUMENTS 8,556,041 B2 * 10/2013 Mustalahti ........... D07B 1/0673 254/390
9,315,363 B2 * 4/2016 Aulanko ................... B66B 7/06
9,352,935 B2 * 5/2016 Baranda .................... B66B 7/06
9,573,792 B2 * 2/2017 Aulanko ............... B66B 11/008
11,186,947 B2 * 11/2021 Vanreyten ............ D07B 1/0633
11,280,047 B2 * 3/2022 Morren ................ D07B 1/0626
11,400,766 B2 * 8/2022 Liu ...................... D07B 1/0606
2009/0107776 A1 * 4/2009 Baranda ............... D07B 1/0673 187/254
2011/0220438 A1 9/2011 Annen et al.
2012/0211310 A1 * 8/2012 Peric ....................... B66B 7/062 187/254
2013/0270043 A1 * 10/2013 Wesson ............... B66B 11/0065 428/375
2013/0270044 A1 10/2013 Zhang et al.
2014/0027211 A1 * 1/2014 Wesson ................ D07B 1/0693 57/232
2014/0291076 A1 * 10/2014 Guilani ................... B66B 7/062 57/216
2014/0302316 A1 * 10/2014 Gallens .................. D07B 5/006 427/180
2014/0374195 A1 * 12/2014 Deconinck ............. D07B 1/162 57/221
2015/0330852 A1 * 11/2015 Garfinkel .................. G01L 5/10 73/766
2017/0328001 A1 * 11/2017 Kirth ...................... D07B 5/006
2017/0362059 A1 12/2017 Baranda et al.
2018/0222721 A1 * 8/2018 Wesson .................... D07B 1/14
2018/0362300 A1 * 12/2018 Mitsui ..................... B66B 7/068
2019/0345004 A1 * 11/2019 Henneau ................. B66B 7/062
2020/0115851 A1 * 4/2020 Vanreyten ................. F16G 1/12
2020/0122972 A1 * 4/2020 Vanreyten ............ D07B 1/0633
2020/0248404 A1 * 8/2020 Morren ................ D07B 1/0626
2020/0270809 A1 * 8/2020 Morren ................ D07B 1/0626
2021/0284501 A1 * 9/2021 Kodeck .................. D07B 5/006
2021/0380371 A1 * 12/2021 De Roose ............... B66B 7/062
2022/0049418 A1 2/2022 Vanreyten et al.

* cited by examiner

HIGH STRENGTH CORD WITH IMPROVED DETECTABILITY

BACKGROUND

Exemplary embodiments disclosed herein relate to elevator systems, and more particularly, to a load bearing member such as used in elevator systems for suspension and/or driving of the elevator car and/or counterweight.

Elevator systems are useful for carrying passengers, cargo, or both, between various levels in a building. Some elevators are traction based and utilize load bearing members such as ropes or belts for supporting the elevator car and achieving the desired movement and positioning of the elevator car.

Where ropes are used as load bearing members, each individual rope is not only a traction device for transmitting the pulling forces but also participates directly in the transmission of the traction forces. Where belts are used as a load bearing member, a plurality of tension elements are embedded in an elastomer belt body. The tension elements are exclusively responsible for transmitting the pulling forces, while the elastomer material transmits the traction forces. Due to the forces acting thereon, each of these tension elements is typically formed from a plurality of fine steel elements or wires.

Deterioration of load bearing members can be caused by normal operation of the elevator over time. The primary source of deterioration is the cyclic bending of the load bearing members around sheaves as the elevator is moved up and down in a hoistway. Because the condition of the load bearing members is critical to the safety of the operation of the elevator, it is desirable to monitor a condition of the load bearing member to detect deterioration, e.g., corrosion, fretting, wire breakage, etc., of the tension elements.

BRIEF DESCRIPTION

According to an embodiment, a tension element for use in a load bearing member of an elevator system includes a first layer having a plurality of first wires and a second layer having a plurality of second wires. The second layer is positioned radially outward of and surrounds the first layer. The first layer has a first lay direction and the second layer has a second lay direction. The second lay direction is opposite the first lay direction.

In addition to one or more of the features described above, or as an alternative, in further embodiments the first lay direction is counterclockwise and the second lay direction is clockwise.

In addition to one or more of the features described above, or as an alternative, in further embodiments the first lay direction is clockwise and the second lay direction is counterclockwise.

In addition to one or more of the features described above, or as an alternative, in further embodiments including a coating layer encapsulating the plurality of first wires.

In addition to one or more of the features described above, or as an alternative, in further embodiments the plurality of second wires is greater than the plurality of first wires.

In addition to one or more of the features described above, or as an alternative, in further embodiments the plurality of second wires is less than the plurality of first wires.

In addition to one or more of the features described above, or as an alternative, in further embodiments the plurality of first wires have a first diameter and the plurality of second wires have a second diameter. The second diameter is different than the first diameter.

In addition to one or more of the features described above, or as an alternative, in further embodiments the second diameter is larger than the first diameter.

In addition to one or more of the features described above, or as an alternative, in further embodiments including a third layer having at least one third wire positioned radially outward of and surrounding the second layer.

In addition to one or more of the features described above, or as an alternative, in further embodiments the third layer has the first lay direction.

In addition to one or more of the features described above, or as an alternative, in further embodiments the third layer has the second lay direction.

In addition to one or more of the features described above, or as an alternative, in further embodiments the third layer further includes a plurality of third wires having a third diameter and a plurality of fourth wires having a fourth diameter. The fourth diameter is larger than the third diameter.

According to an embodiment, a load bearing system for use in an elevator system includes a load bearing member. The load bearing member includes at least one tension element having a plurality of wires arranged in a first layer and a second layer. The second layer is positioned radially outward of and directly adjacent to the first layer such that the second layer surrounds the first layer. The first layer has a first lay direction and the second layer has a second lay direction. The second lay direction is opposite the first lay direction. A jacket material encapsulates the at least one tension element.

In addition to one or more of the features described above, or as an alternative, in further embodiments the first lay direction is counterclockwise and the second lay direction is clockwise.

In addition to one or more of the features described above, or as an alternative, in further embodiments the first lay direction is clockwise and the second lay direction is counterclockwise.

In addition to one or more of the features described above, or as an alternative, in further embodiments the load bearing member further includes a coating layer encapsulating the first layer.

In addition to one or more of the features described above, or as an alternative, in further embodiments including an inspection device operably coupled to the at least one tension element and operable to monitor an electrical resistance of the at least one tension element.

In addition to one or more of the features described above, or as an alternative, in further embodiments the at least one tension element includes a plurality of tension elements spaced laterally across a width of the load bearing member. The inspection device is operably coupled to each of the plurality of tension elements.

In addition to one or more of the features described above, or as an alternative, in further embodiments the plurality of wires being arranged in a third layer positioned radially outward of and surrounding the second layer.

In addition to one or more of the features described above, or as an alternative, in further embodiments the third layer has the first lay direction.

In addition to one or more of the features described above, or as an alternative, in further embodiments the third layer has the second lay direction.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus are presented herein by way of exemplification and not limitation with reference to the Figures.

Figure 1:
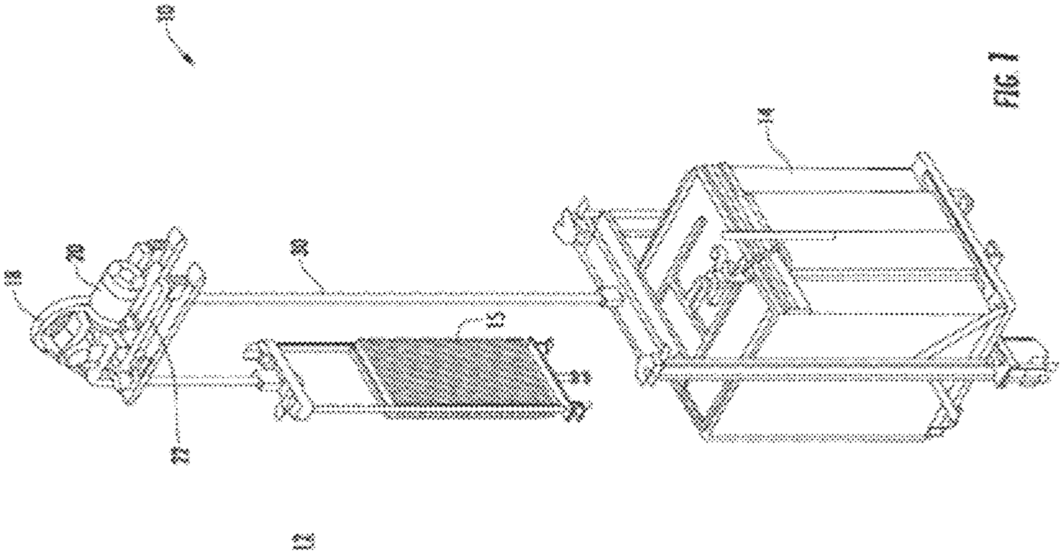
FIG. 1 is a perspective view of an example of a traction elevator system.

With reference now to FIG. 1, an example of an elevator system 10 is illustrated. The elevator system 10 includes an elevator car 14 configured to move vertically upwardly and downwardly within a hoistway 12 along a plurality of car guide rails (not shown). Guide assemblies mounted to the top and bottom of the elevator car 14 are configured to engage the car guide rails to maintain proper alignment of the elevator car 14 as it moves within the hoistway 12.

The elevator system 10 also includes a counterweight 15 configured to move vertically upwardly and downwardly within the hoistway 12. The counterweight 15 moves in a direction generally opposite the movement of the elevator car 14 as is known in conventional elevator systems. Movement of the counterweight 15 is guided by counterweight guide rails (not shown) mounted within the hoistway 12. In the illustrated, non-limiting embodiment, at least one load bearing member 30, for example, a belt, is coupled to both the elevator car 14 and the counterweight 15 and cooperates with a traction sheave 18 mounted to a drive machine 20. To cooperate with the traction sheave 18, at least one load bearing member 30 bends in a first direction about the traction sheave 18.

The drive machine 20 of the elevator system 10 is positioned and supported at a mounting location atop a support member 22, such as a bedplate for example, in a portion of the hoistway 12 or a machine room. Although the elevator system 10 illustrated and described herein has a 1:1 roping configuration, it should be appreciated that an elevator system having another roping configuration is also contemplated herein. Further, an elevator system having another hoistway layout is within the scope of the present disclosure.

Figure 2:
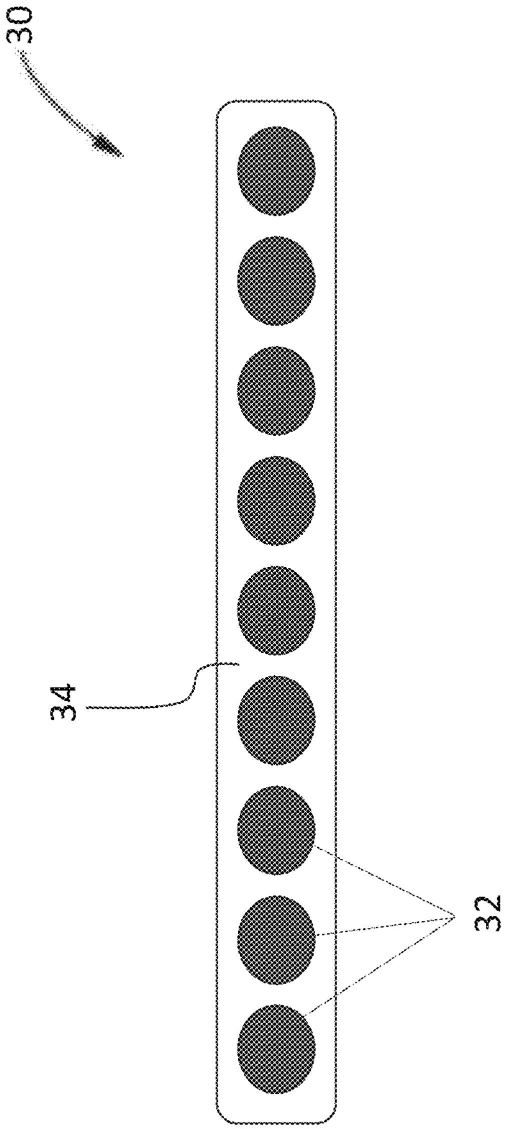
FIG. 2 is a cross-sectional view of a load bearing member of an elevator system according to an embodiment.

With reference now to FIG. 2, a cross-sectional view of an example of a load bearing member 30 in the form of a belt is illustrated. As shown, the belt includes at least one tension element, and in some embodiments, a plurality of tension elements 32 extending longitudinally along a length of the belt 30. In embodiments including multiple tension elements, the plurality of tension elements 32 may be substantially identical, or alternatively may have different configurations. Further, the tension elements 32 be spaced apart or separated from one another such that adjacent tension elements 32 are not arranged in contact. In the illustrated, non-limiting embodiment, the plurality of tension elements 32 are spaced uniformly or non-uniformly across a lateral width of the load bearing member 30.

In an embodiment, the one or more tension elements 32 are at least partially enclosed in a jacket material 34 to not only to protect the tension elements 32, but also to restrain relative movement thereof. The jacket material 34 may define a traction surface configured to contact a corresponding surface of the traction sheave 18. Examples of materials for the jacket material 34 include, but are not limited to polyurethane, styrene butadiene rubber (SBR), nitrile rubber (NBR), acrylonitrile butadiene styrene (ABS), SBS/SEBS plastics, silicone, EPDM rubber, other curable diene based rubber, neoprene, non-curing thermoplastic elastomers, curable extrudable rubber materials, thermoplastics such as nylon, polyester, polyvinyl chloride, polyolefin or the like, each of which can be in the form of a solution, emulsion, prepolymer or other fluid phase. However, it should be understood that any materials suitable to required functions of the load bearing member 30 are within the scope of the disclosure. For example, a primary function of the jacket material 34 is to provide a sufficient coefficient of friction between the load bearing member 30 and the traction sheave 18 to produce a desired amount of traction therebetween. The jacket material 34 should also transmit the traction loads to the tension elements 32. In addition, the jacket material 34 should be wear resistant and protect the tension elements from impact damage, exposure to environmental factors, such as chemicals, for example.

One or more additive materials may be incorporated into the jacket material 34 to enhance performance, such as traction and environmental resistance. For example, carbon black is very effective in improving UV-resistance of elastomers and carbodiimides are very effective in improving hydrolysis resistance of polyurethanes.

In the illustrated, non-limiting embodiment, the belt or load bearing member 30 includes nine tension elements 32. However, it should be understood that the number of tension elements 32 illustrated is intended as an example only, and that a load bearing member 30 having any suitable number of tension elements, such as a single tension element, two, three, four, five, six, seven, eight, ten or more tension elements 32 is within the scope of the disclosure. Further, while the tension elements 32 are shown as having a substantially circular cross-section, the depiction is merely an example. Tension elements 32 having another cross-sectional shape, such as an elliptical or oval cross-section for example, are contemplated herein.

Figure 3:
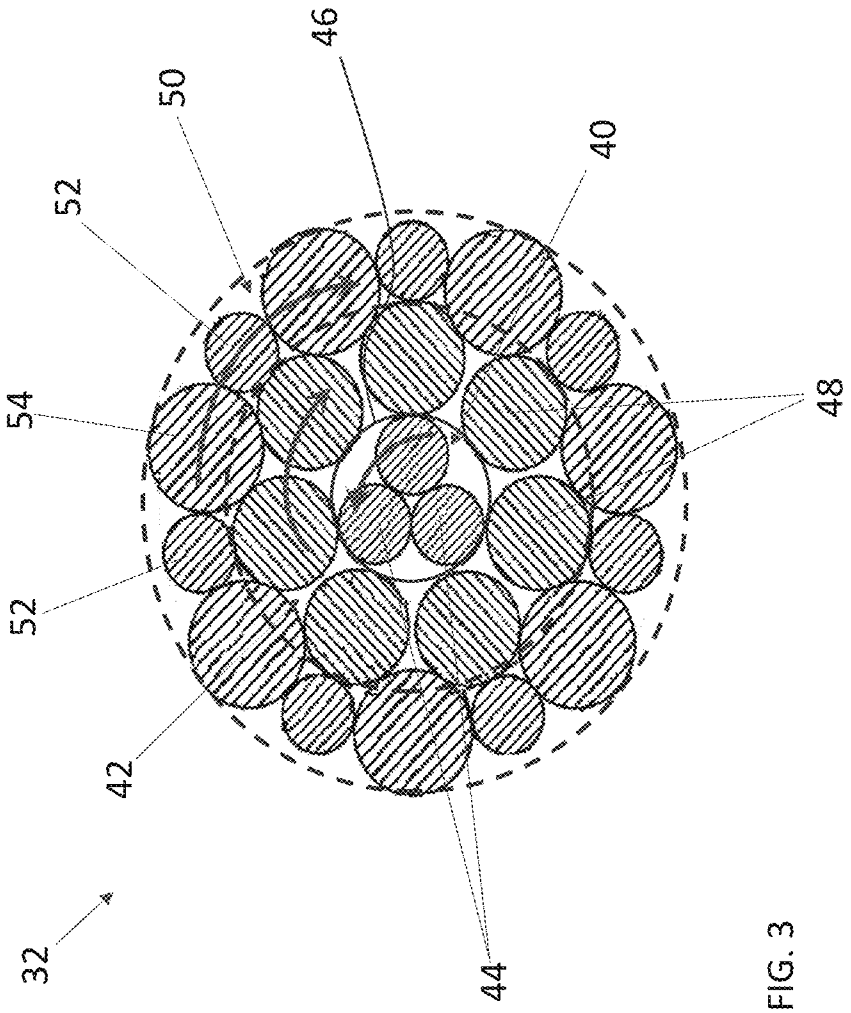
FIG. 3 is a detailed cross-sectional view of a tension element of a load bearing member according to an embodiment.

With reference now to FIG. 3, a cross-sectional view of an exemplary tension element 32 is illustrated in more detail according to an embodiment. As shown, each tension element 32 is formed from a plurality of wires. Although each of the wires of the tension element 32 is illustrated and described herein as a singular wire or filament, it should be appreciated that in other embodiments, each wire may in fact be a bundle or plurality of wires, such as having a twisted configuration.

Figure 5:
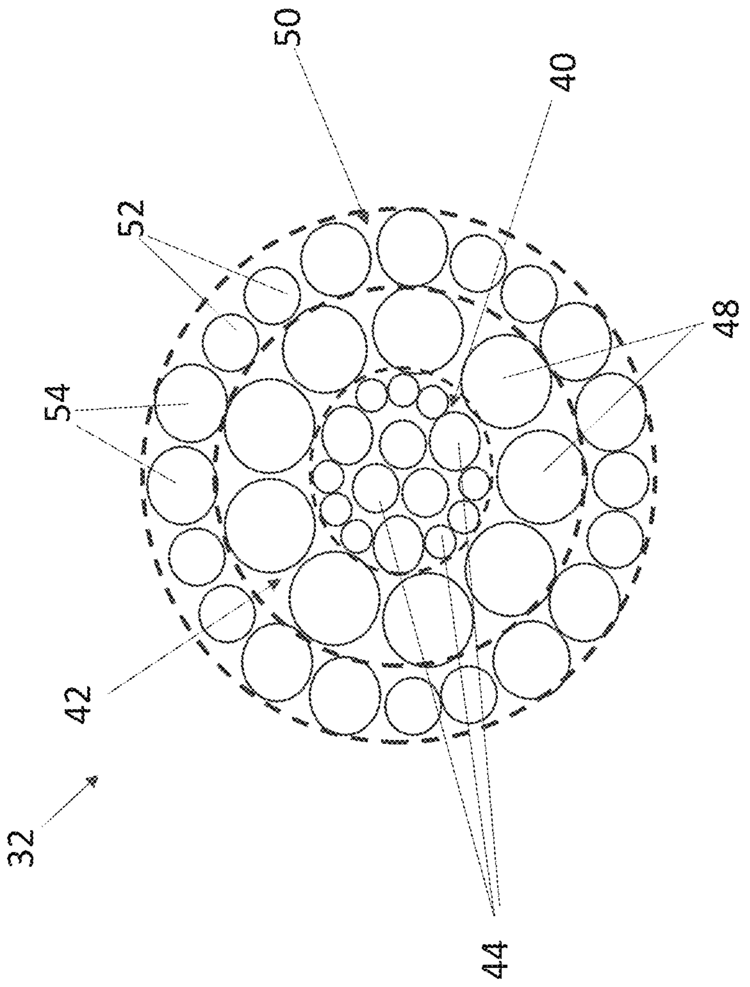
FIG. 5 is a detailed cross-sectional view of a tension element of a load bearing member according to another embodiment.

The wires of the tension element 32 may be arranged in a plurality of stacked or concentric layers including at least a first layer or core 40 and a second layer 42 located radially outward of the first layer 40. In the illustrated, non-limiting embodiment, the first layer 40 includes a plurality of substantially identical first wires 44. However, in other embodiments, such as shown in FIG. 5 for example, a first diameter of the plurality of first wires 44 may vary. For example, the plurality of first wires may include two or more wires having at least two different diameters. In the illustrated, non-limiting embodiment of FIG. 5, the plurality of first wires includes wires having three different diameters. Further, although the first layer 40 is illustrated as having three first wires 44, it should be understood that embodiments where the first layer 40 has any number of first wires 44, including a single wire, two wires, or more than three wires, is within the scope of the disclosure.

In an embodiment, the plurality of first wires 44 are bare or are not coated with or encapsulated within any material. However, in other embodiments a coating layer 46 may be applied about the exterior of the first layer 40 to encapsulate the plurality of first wires 44. Examples of the material of the coating layer 46 include, but are not limited to polyurethane, styrene butadiene rubber (SBR), nitrile rubber (NBR), acrylonitrile butadiene styrene (ABS). SBS/SEBS plastics, silicone. EPDM rubber, other curable diene-based rubber, neoprene, non-curing thermoplastic elastomers, curable extrudable rubber materials, thermoplastics such as nylon, polyester, polyvinyl chloride, polyolefin, or the like. The material used to form the coating layer 46 may be substantially identical to the jacket material 34, or alternatively, may be different therefrom.

Figure 4:
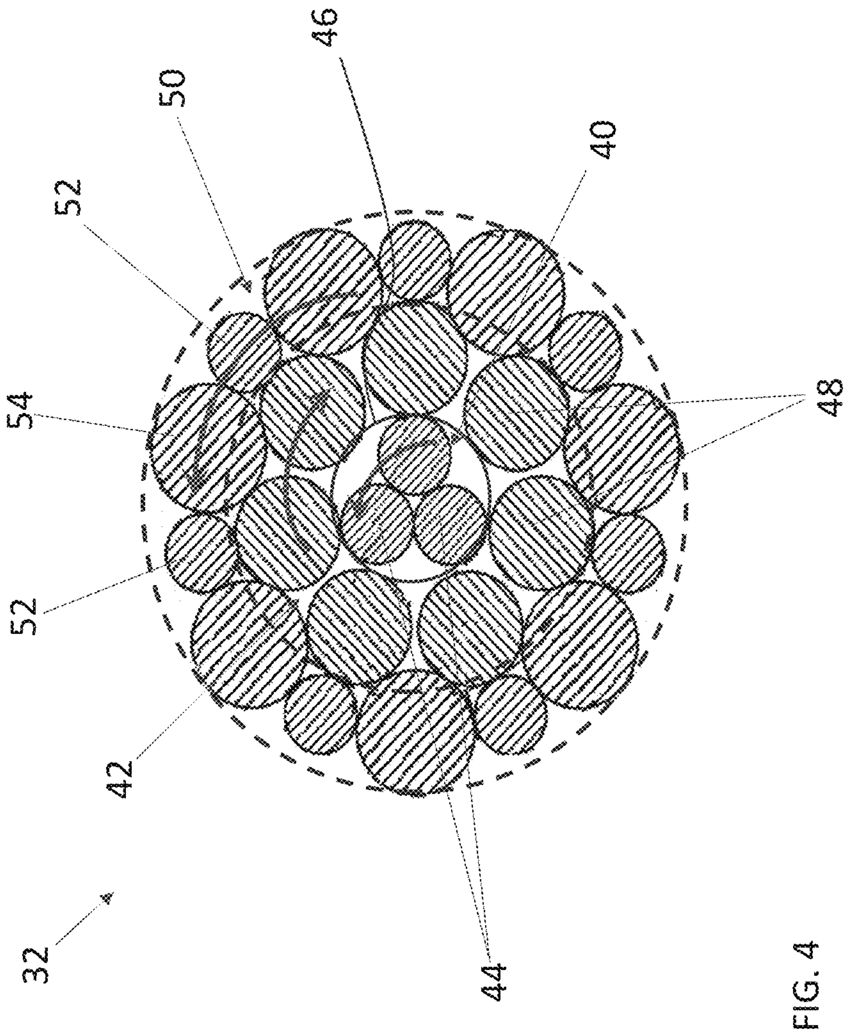
FIG. 4 is a detailed cross-sectional view of a tension element of a load bearing member according to another embodiment.

The second layer 42 similarly includes a plurality of second wires 48. The second wires 48 are arranged to surround or enclose the first layer 40. The second layer 42 typically includes a greater number of wires than the first layer 40, as shown in FIGS. 3 and 4. However, embodiments where the number of first wires 44 arranged within the first layer 40 is greater than the number of second wires 48 in the second layer 42, as shown in FIG. 5, is also within the scope of the disclosure. In the illustrated, non-limiting embodiment, the second layer 42 includes nine second wires 48. However, it should be appreciated that a second layer 42 having any suitable number of wires is contemplated herein. In an embodiment, the plurality of second wires 48 may be substantially identical to one another and have a second diameter. The second diameter may be equal to or may be different than the first diameter of the first wires 44. In the illustrated, non-limiting embodiment, the second diameter is larger than the first diameter; however, in other embodiments the second diameter of the second wires 48 may be the smaller than the first diameter of the first wires 44.

As shown, the tension element 32 may include one or more additional layers, such as a third layer 50 for example, located radially outward of and directly adjacent to the second layer 42 and having a plurality of wires configured to surround the adjacent layer 42. As a result of this configuration, the third layer 50 typically includes more wires than the second layer 42. For example, in the non-limiting embodiment shown in FIG. 3, the third layer 50 includes fourteen wires. However, it should be appreciated that a third layer 50 having any suitable number of wires is contemplated herein.

In the illustrated, non-limiting embodiment, the third layer 50 includes at least one third wire 52 having a third diameter, such as a plurality of third wires 52, and at least one fourth wire 54 having a fourth diameter, such as a plurality of fourth wires for example. The fourth diameter may be larger than the third diameter. However, embodiments where all of the wires of the third layer 50 are substantially identical are also contemplated herein. The third diameter may be substantially identical to or may be different from at least one of the first diameter and the second diameter. In the illustrated, non-limiting embodiment, the third diameter is substantially equal to the first diameter. Similarly, the fourth diameter may be substantially identical to or may be different from at least one of the first diameter and the second diameter. In the illustrated, non-limiting embodiment, the fourth diameter is larger than the first, second, and third diameters.

During formation of the tension element 32, the wires within each respective layer 40, 42, 50 are twisted. The direction of twist of each layer is also known as the lay direction. For example, during formation of the tension element 32, the plurality of first wires 44 are arranged in a desired relative position and oriented generally parallel to one another. Once properly positioned, the plurality of first wires 44, in unison, are twisted about a central axis in either a first direction, such as a counterclockwise direction, or in a second opposite direction, such as a clockwise direction to form the first layer 40. After this twisting is complete, the plurality of second wires 48 of the second layer 42 may be positioned about the outer periphery of the first layer 40. Once properly positioned, the position of the first layer 40 remains fixed and the plurality of second wires 48 are then twisted about the exterior of the first layer 40 in either the first direction or the second direction.

The plurality of wires 52, 54 of the third layer 50 are similarly positioned about the outer periphery of the second layer 42 and then twisted relative to the first and second layers 40, 42, about the exterior of the second layer 42 in either the first direction or the second direction. It should be appreciated that in embodiments including additional layers, the same process of positioning the wires of each layer and then twisting the plurality of wires of that layer relative to the already formed layers of the tension element 32 is performed.

In an embodiment, the first layer 40 of the tension element 32 is formed with a first lay direction and the second layer 42 of the tension element 32 located directly adjacent to the first layer 40, is formed with a second, opposite lay direction. Accordingly, in some embodiments the first layer 40 has a counterclockwise lay direction and the second layer 42 has a clockwise lay direction. Alternatively, the first layer 40 may have a clockwise lay direction and the second layer 42 has a counterclockwise lay direction. In embodiments where the tension element 32 includes one or more layers, such as third layer 50 for example, arranged radially outward of the second layer 42, the lay direction of the layer 50 located radially outward from and directly adjacent to the second layer 42 may be the same direction as the second layer 42 (see FIG. 3), or alternatively, may be the opposite direction as the second layer 42, as shown in FIG. 4.

To maintain safe operation of the elevator system 10, it is desirable to monitor the load bearing member 30 periodically or continuously for degradation and/or damage. One method of performing such monitoring includes measuring the electrical resistance of the tension elements 32 of the load bearing member 30 with an inspection device. Examples of such inspection devices are known in the art. A load bearing member 30 and an inspection device (not shown) operably coupled to the load bearing member in combination may be considered a load bearing system.

When the lay direction of the first layer 40 and the lay direction of the second layer 42 are the same, it is believed that the second wires 48 are arranged in contact with the first wires 44 along a line (line contact). As a result of this line contact, the wire-to-wire contact stresses created during a bending operation of such a tension element 32, such as about traction sheave 18 for example, are minimized, making detection of fretting or deterioration of the tension element 32 difficult. While not wanting to be bound by any specific theory, it is believed that forming the first layer 40 and the second layer 42 of the tension element 32 with opposite lay directions results in point contact rather than line contact between the wires 48 of the second layer 42 and the wires 44 of the first layer 40. The frequency of the point contact and the resulting increase in contact stresses will promote fretting behavior and create detectable increase in electrical resistance after repeated bending operations.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope hereof.

What is claimed is:

1. A tension element for use in a load bearing member of an elevator system, the tension element comprising:

a first layer having a plurality of first wires, the first layer being a core of the tension element, wherein the plurality of first wires are individual wires and the plurality of first wires within the first layer are twisted with a first lay direction;

a second layer having a plurality of second wires, the second layer being positioned radially outward of and surrounding the first layer, wherein the plurality of second wires are individual wires and the plurality of second wires within the second layer are twisted with a second lay direction, wherein the second lay direction is opposite the first lay direction, wherein only one second wire is arranged at each radial position relative to the first layer when the tension element is viewed in a cross-section oriented perpendicular to a longitudinal axis of the tension element;

a third layer having at least one third wire positioned radially outward of and surrounding the second layer, wherein the third layer has the first lay direction.

2. The tension element of claim 1, wherein the first lay direction is counterclockwise and the second lay direction is clockwise.

3. The tension element of claim 1, wherein the first lay direction is clockwise and the second lay direction is counterclockwise.

4. The tension element of claim 1, further comprising a coating layer encapsulating the plurality of first wires.

5. The tension element of claim 1, wherein the plurality of second wires is greater than the plurality of first wires.

6. The tension element of claim 1, wherein the plurality of second wires is less than the plurality of first wires.

7. The tension element of claim 1, wherein the plurality of first wires have a first diameter and the plurality of second wires have a second diameter, the second diameter being different than the first diameter.

8. The tension element of claim 7, wherein the second diameter is larger than the first diameter.

9. The tension element of claim 1, wherein the third layer further comprises a plurality of third wires having a third diameter and a plurality of fourth wires having a fourth diameter, the fourth diameter being larger than the third diameter.

10. A load bearing system for use in an elevator system comprising:

a load bearing member comprising:

at least one tension element having a plurality of individual wires arranged in a first layer, a second layer, and a third layer, the first layer of individual wires forming a core of the at least one tension element and the second layer of individual wires being positioned radially outward of and directly adjacent to the first layer such that the second layer surrounds the first layer, the third layer of individual wires being positioned radially outward of and directly adjacent to the second layer, the first layer having a first lay direction and the second layer having a second lay direction, and the third layer having the first lay direction, the second lay direction being opposite the first lay direction;

wherein a single second wire is arranged at each radial position relative to the first layer when the tension element is viewed in a cross-section oriented perpendicular to a longitudinal axis of the tension element; and a jacket material encapsulating the at least one tension element.

11. The load bearing system of claim 10, wherein the first lay direction is counterclockwise and the second lay direction is clockwise.

12. The load bearing system of claim 10, wherein the first lay direction is clockwise and the second lay direction is counterclockwise.

13. The load bearing system of claim 10, wherein the load bearing member further comprises a coating layer encapsulating the first layer.

14. The load bearing system of claim 10, further comprising an inspection device operably coupled to the at least one tension element and operable to monitor an electrical resistance of the at least one tension element.

15. The load bearing system of claim 14, wherein the at least one tension element further comprises a plurality of tension elements spaced laterally across a width of the load bearing member, wherein the inspection device is operably coupled to each of the plurality of tension elements.

* * * * *